L. A. IAMS.
SELF ACTING SUGAR BOWL.
APPLICATION FILED MAR. 28, 1912.
1,096,430.
Patented May 12, 1914.
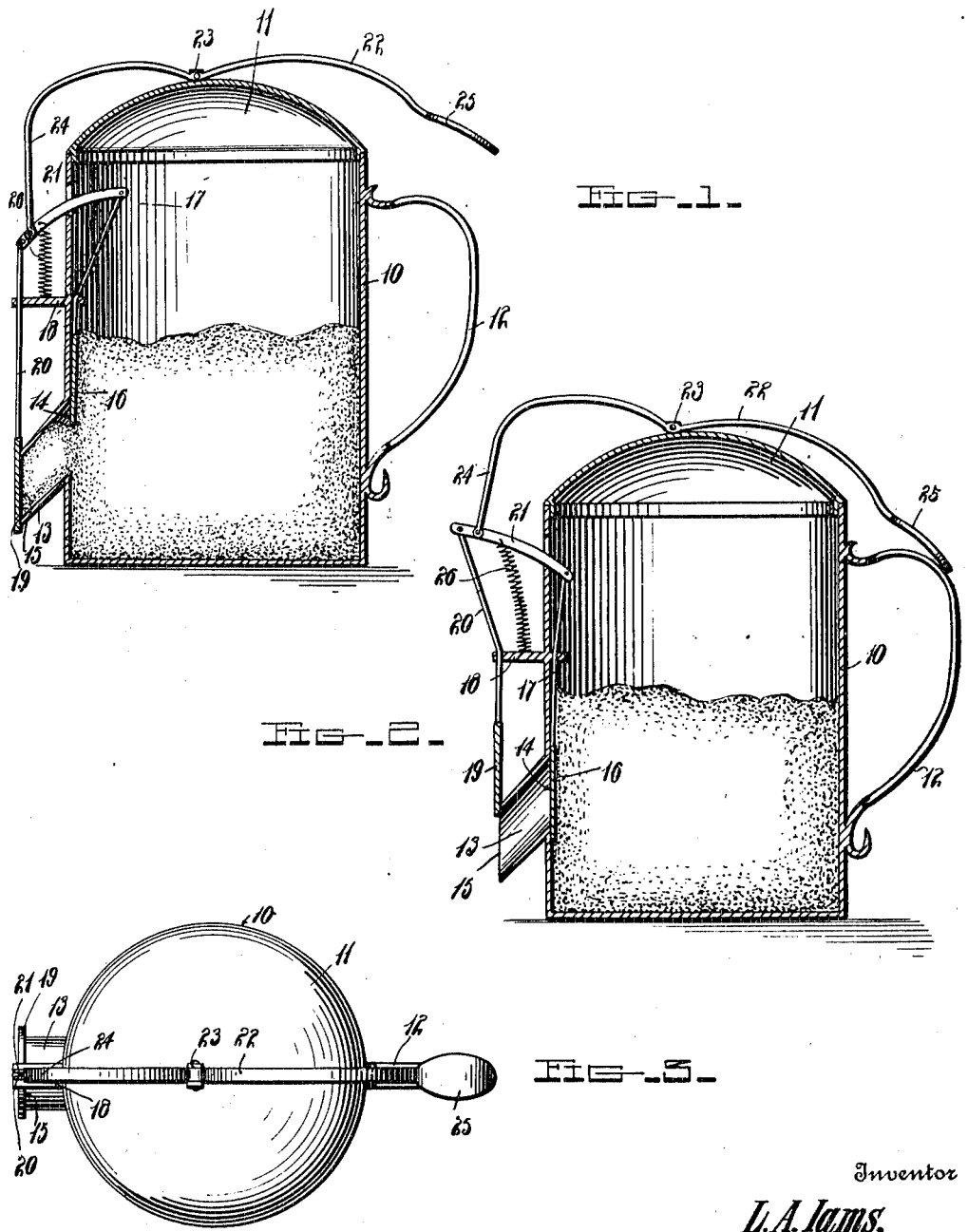
Witnesses
M. C. Fielding.
J. E. Burch.
Inventor
L. A. Iams,
By
Attorneys

UNITED STATES PATENT OFFICE.

LEWIS A. IAMS, OF TAYLOR, NORTH DAKOTA.

SELF-ACTING SUGAR-BOWL.

1,096,430.  Specification of Letters Patent.  Patented May 12, 1914.

Application filed March 28, 1912. Serial No. 686,958.

*To all whom it may concern:*

Be it known that I, LEWIS A. IAMS, a citizen of the United States, residing at Taylor, in the county of Stark, State of North Dakota, have invented certain new and useful Improvements in Self-Acting Sugar-Bowls; and I do hereby declare the following to be a full, clear, and exact description of the invention, such as will enable others skilled in the art to which it appertains to make and use the same.

This invention has special reference to kitchen or table articles and more particularly to the class of sugar bowls or other receptacles, it being the principal object of the invention to provide improved and novel means whereby a certain or any desired quantity of sugar or material will automatically feed to the discharge spout of the receptacle to discharge the bowl when said means are operated.

A further and important object of the invention is to provide a sugar bowl having an inclined discharge spout so disposed as to be automatically filled with sugar, the said spout having valves at its inner and outer ends controlled by novel actuating means so that the valves are opened and closed for filling and discharging the sugar from the spout, thereby dispensing any desired quantity, preferably a spoonful.

With the above and other objects in view, the invention consists of certain combinations and arrangements of parts as will be hereinafter more fully described and claimed, and illustrated in the accompanying drawings, in which:

Figure 1 is a vertical sectional view of my improved sugar bowl with the valves in position for discharging the sugar into the spout. Fig. 2 is a similar view but showing the valves in a reverse position, for discharging the sugar from the spout. Fig. 3 is a top plan view of the device.

Referring more specifically to the drawings, wherein like reference characters designate similar parts throughout the several views, the numeral 10 designates the bowl which is preferably of cylindrical form and provided with a cover 11 and a handle 12. The bowl 10 is also provided with a spout 13 which communicates with the interior of the bowl near its bottom and diametrically opposite relative to the handle 12, the said spout being disposed in an inclined position and having a supply opening 14 for the sugar and an outlet opening 15 through which the sugar is discharged from the spout, the latter of which measures the quantity of sugar.

Operable over the opening 14 is a circular valve or disk 16, the same being carried at the lower end of a flexible stem 17 which is vertically operable through a horizontal guide member 18 carried at the front portions of the bowl above the spout 13 and having its inner end projecting inwardly of the bowl as shown. A valve or disk 19 operates over the discharge end of the spout 13 and is connected with a flexible stem 20, at the lower end of the latter, said stem operating through the outer end of the guide member 18 and being connected at its upper end pivotally to a pivoted lever 21 at the outer end of the latter while the stem 17 connects to the inner end of the said lever whereby when one of the valves is closed the other will be open for feeding or discharging the sugar from the spout as clearly shown in Figs. 1 and 2 of the drawings.

In order to operate the lever 21 and lift the valves 16 and 19 to the opposite positions above referred to, an operating member or lever 22 is pivotally and removably engaged within a catch 23 carried at the central portion of the cover 11 and has its forward end directed downwardly as shown at 24 and connected to the lever 21 near its outer end while the opposite end of the operating member 22 is bent to conform to the shape of the cover 11 at the upper portion of the handle 12 as indicated by the numeral 25. A coiled spring 26 is connected centrally to the guide member 18 and to the lever 21 near its outer end and is adapted to hold the valve 19 normally downward to cover the discharge end of the spout 13 while the valve 16 is retained in a raised or open position to permit the sugar to automatically feed into the spout, the latter of which is adapted to contain the desired quantity as hereinbefore specified. Thus when it is desired to operate the same or to discharge the sugar from the spout 13, the operating member 22 is pressed downwardly toward the handle 12 with or without lifting the bowl, thereby causing said operating member to be swung on its pivot 23 to raise the outer end of the lever 21 against the action of the coiled spring 26 thereby opening the discharge valve 19 by raising it to discharge the sugar from within the spout, while the valve 16 will be moved downwardly to close the opening 14 and prevent the entrance of more sugar into the spout until the valves have been automatically turned to the initial position under the action of the coiled spring 26. During the movements of the valve, the flexible stems 17 and 20 may permit the valves to move without undue friction and also compensate for the movement of the ends of the lever 21 in arcs of circles while the guide members 18 insure of close contact of the valves with the opposite ends of the spout.

I claim:

1. A device of the class described comprising a receptacle, a downwardly inclined spout for the receptacle, guide members carried by the receptacle, flexible stems operating through the said members, valves connected to said stems and operable over the inner and outer ends of the spout and an operating member pivoted on the receptacle and connected to the stems for shifting said valves in opposite direction.

2. The combination with a sugar bowl having a removable cover and an inclined discharge spout; of an operating member detachably mounted on the cover, a lever pivotally carried by the receptacle and connected at its outer end to said operating member, a horizontal guide member having a portion extending inwardly of the bowl, valves arranged over the inner and outer ends of the spout, said lever also extending inwardly of the bowl, stems connecting the valves to the ends of the lever, said guide member holding said valves in close contact with the spout and a coiled spring connecting the lever with the guide member to retain the outer valve in a closed position and the inner valve in an open position whereby a desired quantity of sugar will be automatically fed into the spout, the movement of the operating member causing reverse positioning of the valve to discharge the sugar from the spout.

In testimony whereof, I affix my signature, in presence of two witnesses.

LEWIS A. IAMS.

Witnesses:
   JULIUS WILLIAMS,
   C. H. ENGEN.